Figure 1:
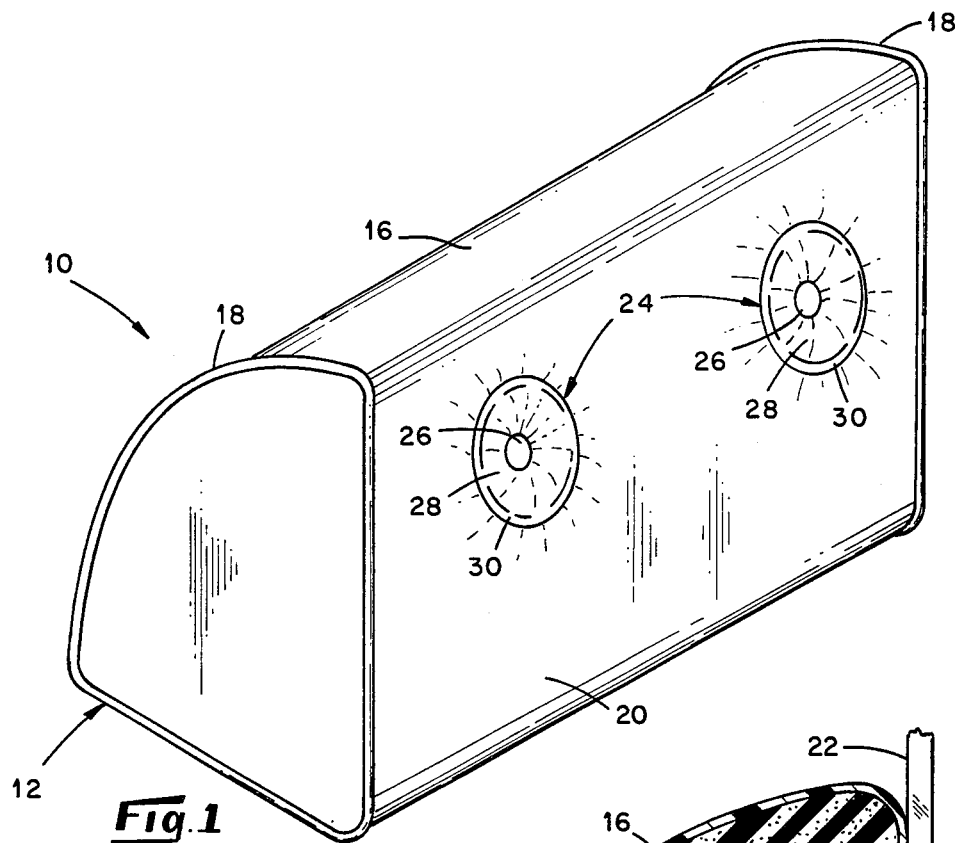

United States Patent [19]

Pesterfield

[11] Patent Number: 4,770,466
[45] Date of Patent: Sep. 13, 1988

[54] HEADREST

[75] Inventor: John B. Pesterfield, Cleveland, Tenn.

[73] Assignee: St. John Manufacturing Company, Inc., Cleveland, Tenn.

[21] Appl. No.: 30,040

[22] Filed: Mar. 24, 1987

[51] Int. Cl.⁴ .............................................. A47C 1/10
[52] U.S. Cl. ...................................... 297/391; 4/575; 248/118
[58] Field of Search .................... 2/434, 436, 441, 408, 2/472; 4/575, 578, 571; 297/395, 391; 248/363, 118

[56] References Cited

U.S. PATENT DOCUMENTS

| 1,721,571 | 7/1929 | Miller | 5/441 X |
| 1,953,798 | 4/1934 | De Grandcourt | 4/185 |
| 1,954,940 | 4/1934 | Mikel | 4/184 |
| 2,161,590 | 6/1939 | Rickard | 4/159 |
| 2,167,178 | 7/1939 | Kohlstadt | 5/436 X |
| 2,260,437 | 10/1941 | Chambers | 5/436 |
| 2,461,880 | 2/1949 | Curran | 5/337 |
| 2,760,788 | 8/1956 | Segall | 280/150 |
| 2,825,069 | 3/1958 | Jorgensen et al. | 4/185 |
| 2,936,139 | 5/1960 | Lindstrom | 248/363 X |
| 3,091,779 | 6/1963 | Lucas et al. | 248/363 X |
| 3,851,919 | 12/1974 | Nacy | 297/395 |

FOREIGN PATENT DOCUMENTS

| 3922262 | 3/1924 | Fed. Rep. of Germany . |
| 91685 | 6/1968 | France . |
| 92536 | 1/1922 | Switzerland | 297/395 |
| 82536 | 1/1922 | Switzerland . |
| 861501 | 2/1961 | United Kingdom | 4/575 |

Primary Examiner—James T. McCall
Attorney, Agent, or Firm—Luedeka, Hodges & Neely

[57] ABSTRACT

A headrest includes recessed suction cups for detachably attaching the headrest to a support surface to substantially prevent the headrest from sagging away from the surface, and limit relative movement between the headrest and the surface.

4 Claims, 1 Drawing Sheet

U.S. Patent  Sep. 13, 1988  4,770,466

HEADREST

The present invention relates to headrests and the like, and more particularly relates to a headrest having suction cups for detachably attaching the headrest to a support surface to substantially prevent the headrest from sagging away from the surface and to limit relative movement between the headrest and the surface.

Headrests are often designed for use as a safety device to minimize head and neck injuries which may otherwise occur as a result of vehicle collisions. It is desirable to make the headrests detachable so that they can be moved from one location to another and/or be positioned optimally with respect to the head and neck area. Detachability has been accomplished by securing suction cups to the headrest for attaching the headrest to a window of the vehicle or other suitable surface at a desired location behind the heads of the occupants.

The detachable headrest of the present invention includes a foam center or the like which may be provided with some type of covering, and suction cups are mounted on the back of the headrest. It has been discovered that one potential problem encountered with a headrest of this construction is that the headrest may sag away from the window, especially when the suction cups are attached only to the covering. Headrests which sag in the manner described are unattractive and function poorly.

Headrests of this type are also subjected to forces attendant movement of the vehicle which may lead to separation of the suction cups from the window. The tendency of the headrests to separate is greater where relative movement between the headrest and window is permitted, or where the headrests sag away from the window. For example, headrests have been made which employ suction cups located at the top of the headrest on band-like vertical extensions. These and other similarly configured headrests may swing out away from the window during stopping and starting of the vehicle. This would exert a cyclic pull on the suction cups which can weaken the attachment leading to eventual separation of the cups from the window. Headrests that sag away from the window would also suffer from this problem.

Accordingly, a need exists for a headrest incorporating suction cups to detachably attach the headrest to a support surface in a manner which substantially prevents the suction cups from sagging away from the support surface. A further need exists for a headrest having suction cups which are configured to limit relative movement between the headrest and support structure. A more particular need exists for a headrest of the character described for use in vehicles such as trucks on the glass windows located immediately behind the seat.

The present invention meets the above needs and others through the provision of a headrest for being detachably attached to a support surface which comprises a body including a resiliently deformable material and a mounting surface defined on the body for being positioned adjacent the support surface. At least one suction cup is disposed on the mounting surface for detachably attaching the body to the support surface. The cup includes a lip for sealingly engaging the support surface. The suction cup is secured to the body in a recessed position on the mounting surface so that the lip of the suction cup is disposed generally in the plane of the mounting surface. When the suction cup is employed to attach the body to the support surface, the mounting surface is disposed in close proximity to the support surface which substantially prevents the headrest from sagging away from the surface and limits relative movement between the headrest and the surface.

In one embodiment, the headrest includes a resting surface defined on the body on a generally opposite side thereof from the mounting surface. The suction cup is secured to the body in its recessed position using a button disposed on the resting surface along with means interconnecting the button and the suction cup through the resiliently deformable material. The suction cup is pulled against the mounting surface to inwardly deform the resiliently deformable material and is held in its recessed position by the interconnecting means and button with the resiliently deformable material applying forces outwardly of the body against both the button and suction cup. The interconnecting means preferably includes hooks, eyelets or the like which are provided on both the button and the inside portion of the base of the suction cup, and a string or other suitable means which is connected between the hooks to hold the button and suction cup together in the aforementioned manner. Since the suction cup is connected through the body, problems associated with attachment of the cups to only one surface thereof are avoided. This arrangement also restricts movement of the cup relative to the body which contributes to minimization of movement between the headrest and the support surface.

Figure 2:
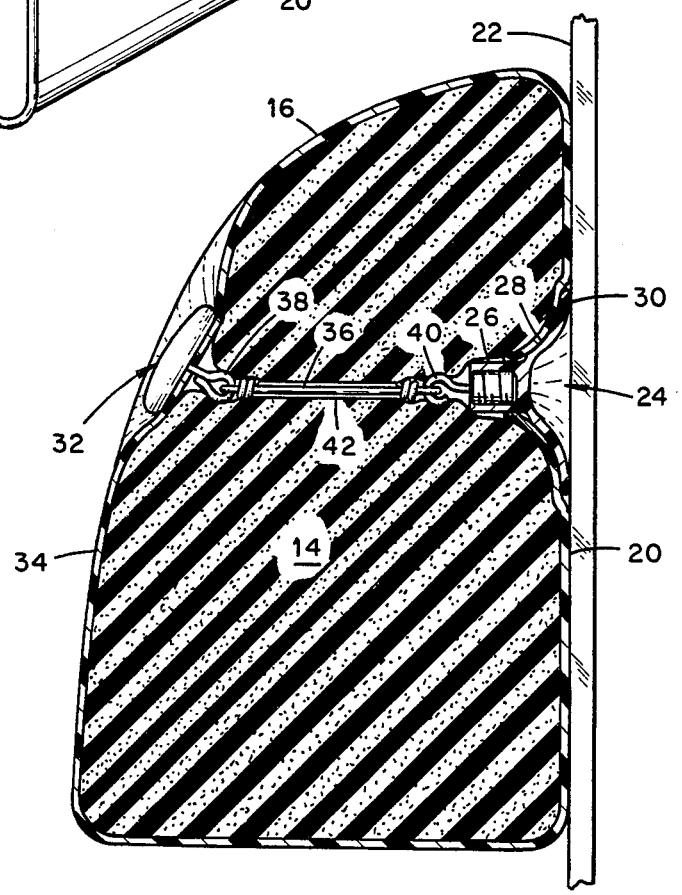

The above and other aspects and advantages of the present invention will become readily apparent and may best be understood by reference to the following detailed description when considered in conjunction with the accompanying drawings in which:

FIG. 1 is a perspective view of a headrest illustrating features of the present invention; and FIG. 2 is a cross-sectional view of the headrest shown in FIG. 1 illustrating attachment of the headrest to a support surface.

Referring now to the drawings in which like reference characters designate like or similar parts throughout the several views, features of a headrest 10 constructed in accordance with a preferred embodiment of the present invention are illustrated in FIGS. 1 and 2. The headrest 10 includes a body portion 12 comprising an impact-absorbing material such as a resiliently deformable molded foam core 14 which defines the overall general shape of the headrest 10. A cover 16 may be provided to cover and protect the core 14 or to match the headrest 10 with the vehicle interior, and may include piping 18 on the ends to aid in defining and maintaining the shape of the cover 16. The cover 16 can be made removable for cleaning or replacement by suitable means such as a zipper or the like (not shown).

A mounting surface 20 is defined on the body 12 for being positioned adjacent a support surface 22 on which the headrest is to be attached such as the rear glass window in a pickup truck, for example. The shape of the mounting surface 20 is preferably generally planar as shown and according to the embodiment depicted is defined substantially by the shape of the core 14.

The headrest 10 is detachably attached to the mounting surface 20 using suction cups which, in the illustrated embodiment, comprise a pair of horizontally aligned, spaced-apart suction cups 24 formed of a suitable material such as rubber or flexible plastic. The cups 24 are preferably positioned with their centers nearer to the top of the headrest 10 than to its bottom. Each of the cups 24 includes a base 26, a conical wall 28, and a continuous rim or lip 30. The lips 30 are configured to sealingly engage the support 22 in a known manner when the suction cups 24 are urged from their base ends 26 toward the surface 22 and then released, so as to produce a slight vacuum in the area between the conical walls 28 and support surface 22 to hold the cups 24 on the surface 22.

The suction cups 24 are secured to the body 12 in a recessed position on the mounting surface 20 with the lips 30 of the suction cups 24 disposed generally in the plane of the mounting surface 20. As a result, the mounting surface 20 is disposed in close proximity to the support surface 22 when the headrest 10 is attached thereto which limits movement of the headrest 10 in relation to the surface 22 and substantially prevents the headrest 10 from sagging away from the surface 22. As used herein, "close proximity" is meant to include conditions where the mounting surface 20 is disposed adjacent to the support surface 22 with an appreciable portion of the mounting surface 20 in contact with and generally parallel to the support surface 22, as well as conditions where the mounting surface 20 is disposed very close to the support surface 22 and generally parallel thereto with very little or no contact between the surfaces 20 and 22. Also, the mounting surface 20 is considered to include that portion of the mounting surface 20 of the body 12 which surrounds the cups 24 or other portions of the headrest which may be disposed in contact with or generally parallel to the support surface 22 when the cups 24 are attached thereto.

The cups are preferably secured to the body 12 and maintained in the aforementioned recessed condition by anchoring the cups 24 through the body 12 to its opposite side. In a preferred embodiment, this is accomplished by interconnecting the base ends 26 of the suction cups 24 with buttons 32 which are located on a resting surface 34 of the body 12 formed on a generally opposite side of the body 12 from the mounting surface 20. The interconnection between the buttons 32 and the suction cups 24 pulls both the buttons 32 and suction cups 24 into the body 12 against the resiliently deformable core 14 to dispose and maintain the suction cups 24 in the aforementioned recessed position on mounting surface 20. Preferably, the buttons 32 and suction cups 24 are interconnected by a string 36 or the like which is tied at its opposite ends to an eyelet 38 of the buttons 32 and an eyelet 40 threadably received in the base ends 26 of the suction cups 24. The string 36 passes through the core 14 in an opening 42 formed therein extending from the resting surface 34 to the mounting surface 20. When a covering 16 is used as in the illustrated embodiment, appropriate openings are formed therein at the desired locations of the buttons 32 and suction cups 24 to receive the hooks 38 of the buttons and base ends 38 of the suction cups 24, respectively, which openings are aligned with the opening 42 passing through the core 14.

Preferably, the core 14 is configured to exert a substantial outward force on both the buttons 32 and suction cups 24 keeping the string 36 taut and helping to maintain the buttons 32 and suction cups 24 in an outward disposition. The force exerted on the cups 24 produces a more rigid attachment of the cups 24 to the body 12 because the material of the core 14 applies a substantially uniform pressure against the outer surfaces of the conical walls 28 which minimizes movement of the cups 24 in relation to the body 12. It is particularly noted that movement of cups 24 in relation to the mounting surface 20 is restricted even though forces on the cups 24 may be unequally distributed which would otherwise tend to cause the cups to pivot on the mounting surface 20 when the headrest 10 is being used. This has the effect of further limiting movement of the headrest 10 in relation to the surface 22 and contributes significantly to prevention of sagging and separation problems.

Depending on the materials used, it may be desirable to adjust the position of the suction cups 24 so that the lips 30 are disposed slightly outside the plane of the mounting surface 20 which is considered to be "generally" in the plane of the mounting surface 20 as the term is used herein. This position of the lips may be important, for example, because they are normally radially expanded and deformed against the surface 20 as the suction cups 24 are urged against the surface 22; and any attendant contact between the mounting surface 20 and support surface 22 may interfere with attachment of the cups 24 to the surface 22. Thus, in the preferred embodiment, the disposition of the lips 30 of the suction cups 24 relative to the plane of the mounting surface 20 is selected so that contact between the surfaces 20 and 22 during or after application of the headrest to the surface 22 does not interfere with attachment and maintenance of the cups 24 on the surface 22.

The previously described embodiment offers numerous advantages over known headrests. A primary advantage is substantial elimination of the sagging problem. Elimination of this and other problems according to the present invention also offers advantages in terms of the function of the headrest because a more rigid overall structure is obtained and relative movement between the headrest and the support surface is minimized.

Although a particular embodiment of the present invention has been described in the foregoing detailed description, it will be understood by those of ordinary skill in the art that the invention is capable of numerous rearrangements, modifications and substitutions without departing from the scope and spirit of the claims below. For example, although a pair of horizontally aligned, spaced apart suction cups 24 are preferred, it will be understood that any number of suction cups may be provided depending on particular needs. In addition, the shape of the headrest 10 may vary depending on many factors including the shape of the support surface 22 as well as aesthetic factors.

What is claimed is:

1. A headrest for being detachably attached to an upright support surface in a vehicle, comprising:
   a core comprising a resiliently compressible material and defining an inner mounting surface for being positioned adjacent the upright support surface and an outer head support surface located on a generally opposite side thereof from said mounting surface;
   a cover conformingly disposed on said core;
   suction cups disposed adjacent said mounting surface outside of said cover for detachably attaching the headrest to the upright support surface and having rims for sealably engaging the support surface;
   buttons disposed on said head support surface outside of said cover; and
   a link interconnecting each of said buttons with one of said suction cups through said core and configured to exert a force on said buttons and suction cups inwardly of said core to hold said buttons and suction cups against said head support and mounting surfaces, respectively, in opposition to said resiliently compressible material of said core.

2. The headrest of claim 1, wherein said suction cups comprise a pair of horizontally aligned, spaced-apart suction cups.

3. The headrest of claim 1, wherein said mounting surface is generally planar and includes a top and a bottom, and said suction cups comprise at least two horizontally aligned, spaced-apart suction cups located closer to the top of said mounting surface than to the bottom of said mounting surface.

4. The headrest of claim 1, wherein said mounting surface is generally planar and said suction cups have lips for sealingly engaging the upright support surface, and are held by said lips in a recessed position such that said suction cups are pulled into said mounting surface against the force of said resiliently compressible material of said core with their lips maintained closely adjacent the plane of said mounting surface.

* * * * *